(12) United States Patent
Armbruster et al.

(10) Patent No.: US 8,075,044 B2
(45) Date of Patent: Dec. 13, 2011

(54) CONVERTIBLE

(75) Inventors: Reiner Armbruster, Muehlacker (DE); Joachim Knirsch, Hüttlingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 265 days.

(21) Appl. No.: 11/944,114

(22) Filed: Nov. 21, 2007

(65) Prior Publication Data

US 2009/0115219 A1  May 7, 2009

(30) Foreign Application Priority Data

Nov. 23, 2006 (DE) .......................... 10 2006 055 191

(51) Int. Cl.
*B60J 7/08* (2006.01)
(52) U.S. Cl. .................... 296/136.06; 296/124; 296/128
(58) Field of Classification Search ............. 296/136.01, 296/136.04, 136.05, 136.06, 125, 124
See application file for complete search history.

(56) References Cited

U.S. PATENT DOCUMENTS

| | | | | |
|---|---|---|---|---|
| 282,998 A | * | 8/1883 | Lepper | 296/125 |
| 1,491,621 A | * | 4/1924 | Pfander et al. | 296/125 |
| 3,053,567 A | * | 9/1962 | Geiger | 296/107.08 |
| 5,016,425 A | * | 5/1991 | Weick | 53/453 |
| 5,035,461 A | | 7/1991 | Zweigart | |
| 5,125,428 A | * | 6/1992 | Rauter | 137/199 |
| 5,197,778 A | * | 3/1993 | Burst | 296/107.08 |
| 6,010,179 A | * | 1/2000 | McGoldrick | 296/124 |
| 6,322,132 B1 | | 11/2001 | Hasselgruber | |
| 6,824,195 B2 | * | 11/2004 | Grunow et al. | 296/136.05 |
| 2002/0135201 A1 | | 9/2002 | Liedmeyer et al. | |
| 2004/0217044 A1 | * | 11/2004 | Gill et al. | 210/232 |
| 2006/0043759 A1 | | 3/2006 | Habacker | |

FOREIGN PATENT DOCUMENTS

| | | |
|---|---|---|
| CA | 1078541 A1 | 5/1980 |
| DE | 2622343 A1 | 12/1976 |
| DE | 3915867 C1 | 6/1990 |
| DE | 4106732 A1 | 9/1992 |
| DE | 10039683 A1 | 3/2002 |
| DE | 19813347 C2 | 7/2002 |
| DE | 10252987 A1 | 6/2004 |
| DE | 10311142 A1 | 9/2004 |
| DE | 102004010628 A1 | 9/2005 |
| DE | 102004038433 A1 | 2/2006 |
| EP | 1080964 B1 | 3/2006 |
| JP | 09123945 A * | 5/1997 |
| WO | 2005084982 A1 | 9/2005 |

OTHER PUBLICATIONS

European Office Action dated Oct. 19, 2009.

* cited by examiner

*Primary Examiner* — Glenn Dayoan
*Assistant Examiner* — Sunsurraye Westbrook

(57) ABSTRACT

A convertible has a convertible top which can be put away in the rear region of the convertible and, in a fully open position, is received in a convertible top compartment which can be at least partially closed by a convertible top compartment cover. In this case, the put-away convertible top is held down with the aid of the convertible top compartment cover and is fixed in the held-down position by at least one holding-down device which can be placed onto the convertible top and is disposed on the convertible top compartment cover. The holding-down device has a friction-reducing coating facing the convertible top.

8 Claims, 3 Drawing Sheets

CONVERTIBLE

CROSS-REFERENCE TO RELATED APPLICATION

This application claims the priority, under 35 U.S.C. §119, of German application DE 10 2006 055 191.5, filed Nov. 23, 2006; the prior application is herewith incorporated by reference in its entirety.

BACKGROUND OF THE INVENTION

Field of the Invention

The present invention relates to a convertible with a convertible top which can be put away in the rear region of the convertible and in a fully open position is received in a convertible top compartment which can be at least partially closed by a convertible top compartment cover. The put-away convertible top is held down with the aid of the convertible top compartment cover and is fixed in the held-down position. For this purpose, the convertible top compartment cover is assigned at least one holding-down device which can be placed onto the convertible top.

Published, non-prosecuted German patent application DE 10 2004 010 628 A1 discloses a convertible with a roof which can be put away in the rear region of the vehicle and, in a fully open position, is held below a closed convertible top compartment cover and can be fixed in its position with the aid of the latter, wherein, for this purpose, the convertible top compartment cover is assigned at least one holding-down device. When the convertible top compartment cover is closed, the holding-down device has an extension component which faces rearward and can be changed in length. By this measure, tolerances in particular from the manufacturing of the body shell are to be able to be compensated for.

German patent DE 198 13 347 C2 discloses a vibration-damping holding down device with high wear resistance and low surface abrasion, which is a molded part with an elastomeric plastic, thermoplastic, natural rubber and/or mixtures of the same.

Further convertibles and convertible tops are known, for example, from published, non-prosecuted German patent application DE 41 06 732 A1 (corresponding to U.S. Pat. No. 5,197,778) and from German patent DE 39 15 867 C1.

In the case of conventional convertible tops, it is usually known to hold them down in an open state in a convertible top compartment by a convertible top compartment cover with corresponding holding-down devices. Due to relative movements between the holding down device and the put-away convertible top during the driving mode of the convertible, in particular at the contact points between the holding-down device and a convertible top cloth of the convertible top, chafing of the convertible top cloth may occur and therefore the service life of the convertible top may be impaired.

SUMMARY OF THE INVENTION

It is accordingly an object of the invention to provide a convertible that overcomes the above-mentioned disadvantages of the prior art devices of this general type, which is improved or at least a different embodiment which is distinguished in particular by an increased service life.

With the foregoing and other objects in view there is provided, in accordance with the invention, a convertible. The convertible contains a convertible top compartment cover, a convertible top compartment, and a convertible top which can be put away in a rear region of the convertible and in a fully open position, the convertible top is in the convertible top compartment which can be at least partially closed by the convertible top compartment cover. The convertible top in a put away position is held down with an aid of the convertible top compartment cover and is fixed in a held-down position. At least one holding-down device is associated with the convertible top compartment cover for assisting in fixing the convertible top in the held-down position and is placed onto the convertible top. The holding-down device has a friction-reducing coating facing the convertible top.

The present invention is based on the general concept of reducing the friction between a convertible top cloth of the put-away convertible top and at least one holding-down device which faces the convertible top cloth and holds down the convertible top in its put-away position. This is achieved according to the invention in that the at least one holding-down device has a friction-reducing coating facing the convertible top cloth. Such a coating reduces the frictional resistance between the holding-down device and the convertible top or the convertible top cloth and thereby reduces a mechanical loading to which the convertible top is subjected, thus increasing its service life. In addition, abrasion phenomena on a convertible top cloth of the convertible top become apparent significantly less rapidly, if at all, as a result of which the convertible top cloth retains a visually satisfactory state over the long term.

The coating is expediently formed from polytetrafluoroethylene or from a thermoplastic polyurethane (TPU). Polytetrafluoroethylene is a fully fluorinated polymer and is frequently referred to colloquially by the trade name TEFLON®. Polytetrafluoroethylene has a much lower coefficient of friction and, furthermore, has the advantageous property that the stiction is precisely the same magnitude as the sliding friction, thus enabling a transition from standstill to movement to take place smoothly. For these reasons, the plastic is particularly suitable to form the holding-down device's coating which faces the convertible top.

The coating is expediently formed as an, in particular self-adhesive, film. Such an, in particular self-adhesive, film facilitates the application of the coating on the holding-down device. Variants in which the coating is formed as a film with an adhesive which can be activated by heat are also conceivable, thus enabling the coating to be, for example, ironed onto the holding-down device. It is likewise conceivable to insert the film into a mold for producing the holding-down device. The holding-down device is then produced in a foaming process.

In an advantageous development of the solution according to the invention, a friction-reducing coating which at least partially surrounds the holding-down device is arranged on the convertible top compartment cover. When the convertible top is put away in the convertible top compartment, the folding device that frequently, in addition to contact between the convertible top cloth and the holding-down device, there is also direct contact between the convertible top cloth and the convertible top compartment cover, and therefore, in particular at such contact points, a friction-reducing coating is likewise to be disposed. If there is such a friction-reducing coating in these additional contact regions, then the mechanical loading to which the convertible top cloth is subjected due to friction is reduced, thus enabling the service life of the convertible top to be increased.

It goes without saying that the features mentioned above and those which have yet to be explained below can be used not only in the respectively stated combination but also in different combinations or on their own without departing from the scope of the present invention.

In accordance with an added feature, the holding-down device is a strip extending over at least part of transverse dimensions of the convertible top compartment cover and, when the convertible top compartment cover is closed, rests in a planar manner on the convertible top. The convertible top compartment cover has a positioning opening and the strip has at least one positioning element. The positioning element faces the convertible top compartment cover and interacts with the positioning opening disposed on the convertible top compartment cover. The positioning element can be configured as at least one of a plug-in element and a latching element which can be plugged into the positioning opening is disposed on the convertible top compartment cover and/or can be latched to a mating latching element disposed on the convertible top compartment cover.

In accordance with another feature of the invention, the holding-down device configured as the strip is adhesively bonded, at least in a punctiform manner, to the convertible top compartment cover.

Other features which are considered as characteristic for the invention are set forth in the appended claims.

Although the invention is illustrated and described herein as embodied in a convertible, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
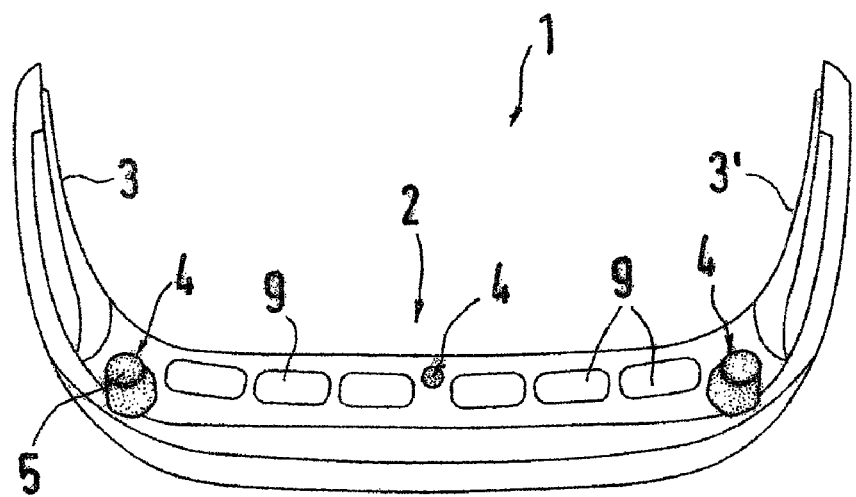
FIG. 1 is a diagrammatic view of a convertible top compartment cover with a holding-down device according to the invention.

Referring now to the figures of the drawing in detail and first, particularly, to FIG. 1 thereof, there is shown a convertible top compartment cover 1 has a central section 2 and two side sections 3, 3' each adjoining it on the longitudinal end side. The convertible top compartment cover 1 is usually disposed above a non-illustrated convertible top compartment and closes the convertible top compartment in the manner of a stiff tarpaulin if a convertible top, which can be opened, is stowed in its put-away position in the convertible top compartment. A convertible top compartment cover 1 of this type is therefore usually used in a convertible. When the convertible top is fully open, the convertible top compartment receives the convertible top within it, with the put-away convertible top is held down with the aid of the convertible top compartment cover 1 and is fixed in the held-down position. In order to hold down the convertible top in its put-away position, at least one holding-down device 4 which can be placed onto the convertible top is disposed on the convertible top compartment cover 1. A holding-down device 4 of this type is formed, for example, from a vibration-damping plastic, in particular from a foam, and therefore no vibrations are transmitted from the convertible top compartment cover 1 to the convertible top or the convertible top cloth.

Figure 5:
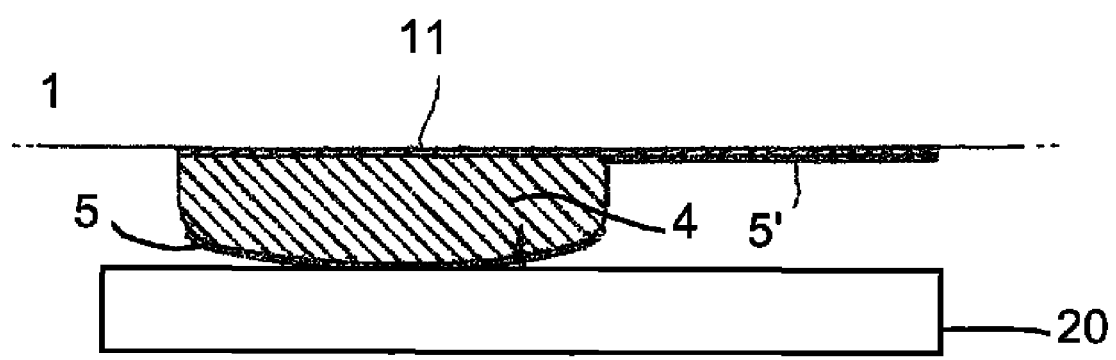
FIG. 5 is a diagrammatic, perspective view of a holding-down device cooperating with a convertible top.

Since, when the convertible top is open, the convertible top compartment cover 1 is supported on the convertible top cloth of the convertible top 20 via the at least one holding-down device 4 as shown in FIG. 5, mechanical loadings occur in particular in the contact zone between the holding-down device 4 and the convertible top cloth of the convertible top 20 and, in an unfavorable situation, may lead to the life expectancy being impaired and/or to visually visible damage to the convertible top cloth.

In order to be able to reduce these mechanical loadings which occur in particular during driving, the at least one holding-down device 4 has a friction-reducing coating 5 facing the convertible top. A coating 5 of this type can be formed, for example, from polytetrafluoroethylene (TEFLON®) or from a thermoplastic polyurethane (TPU). A polytetrafluoroethylene is usually also referred to as an anti-stick coating and is distinguished by extremely low coefficients of friction. In addition, a coefficient of stiction in such a material is of the same magnitude as a coefficient of sliding friction, which has a particularly positive effect on the loadings occurring between convertible top and convertible top compartment cover 1.

In order to be able to apply the coating 5 to the at least one holding-down device 4 in as simple a manner as possible, the coating may be formed as a film, in particular as a self-adhesive film, with it also being conceivable for the coating 5 to have an adhesive layer which can be activated by heat such that the coating 5 can be, for example, ironed onto the holding-down device 4. A connection between the coating 5 and the holding-down device 4 can also take place during a foaming process of the holding-down device 4.

Since the convertible top cloth of the convertible top 1 is folded in the open state, it is entirely conceivable that contact between the convertible top compartment cover 1 and the convertible top cloth exists not only in the region of the at least one holding-down device 4 but also, for example, in adjacent regions, for which reason it is extremely expedient to additionally provide regions which are at risk of contact with a friction-reducing coating 5'.

Figure 2:
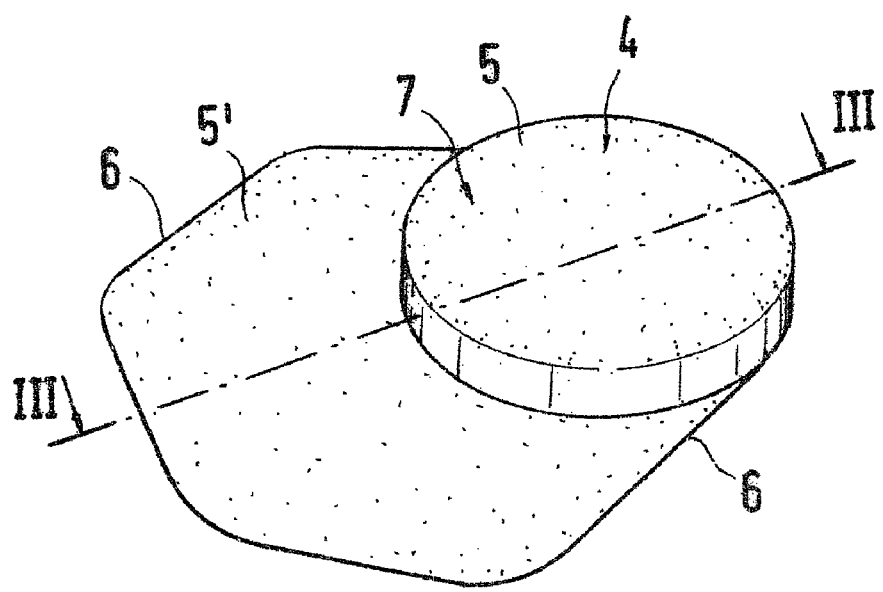
FIG. 2 is a diagrammatic, perspective view of a holding-down device with a coating which at least partially surrounds it.

In this connection, FIG. 2 shows a holding-down device 4 which is at least partially surrounded by such a friction-reducing coating 5'. It is conceivable in this case for the coating 5' which at least partially surrounds the holding-down device 4 to be fixed on a support layer 11 extending between the holding-down device 4 and the convertible top compartment cover 1, as a result of which the holding-down device 4 is fastened to the convertible top compartment cover 1 via the support layer 11 (also see FIG. 3). For simple fastening, the support layer 11 can also be formed here as an, in particular self-adhesive, film, with polytetrafluoroethylene or thermoplastic polyurethane (TPU) preferably also being used as the material for the coating 5' of the functional surfaces.

A further simplification of the manufacturing and of the fitting of the holding-down device 4 according to the invention on the convertible top compartment cover 1 is provided, for example, by the support layer 11 or coating 5' which supports the holding-down device 4, and the holding-down device 4 itself forming a subassembly which can be premanufactured and which merely has to be connected to the convertible top compartment cover 1 during the final installation. In this case, the coating 5', as mentioned previously, can also be formed as a self-adhesive film such that it can simply be adhesively bonded together with the holding-down device 4 on the convertible top compartment cover 1. In this case, in particular edges 6 of the coating 5' surrounding the holding-down device 4 can be cut in such a manner that they are aligned with corresponding edges on the convertible top compartment cover 1, and, as a result, precise and simple positioning of the subassembly, formed from the holding-down device 4 and the coating 5', on the convertible top compartment cover 1 is made possible.

Figure 3:
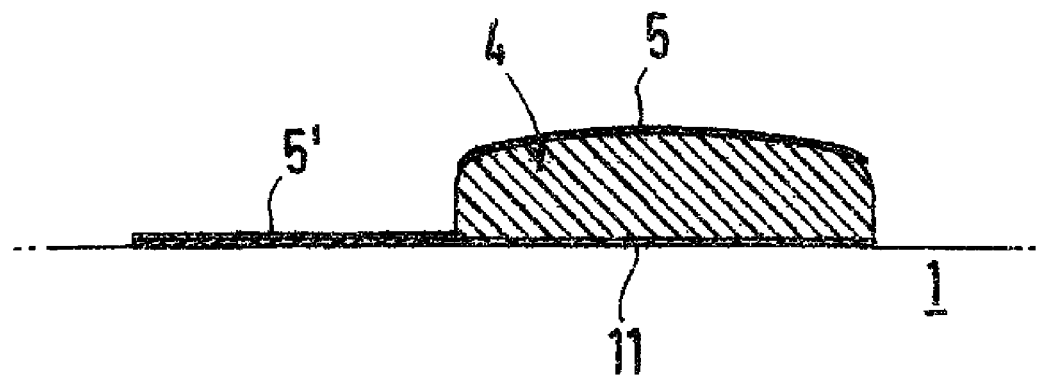
FIG. 3 is a diagrammatic, sectional view taken along the section line III-III shown in FIG. 2.

FIG. 3 shows a section through the holding-down device 4 according to the invention, the support layer 11 which at least partially surrounds the holding-down device 4 also extending below the holding-down device 4. The holding-down device 4 according to FIG. 3 has a free end which is slightly convexly rounded, is likewise coated with the friction-reducing coating 5 and comes into contact with a convertible top cloth (not shown) via the coating 5.

Figure 4:
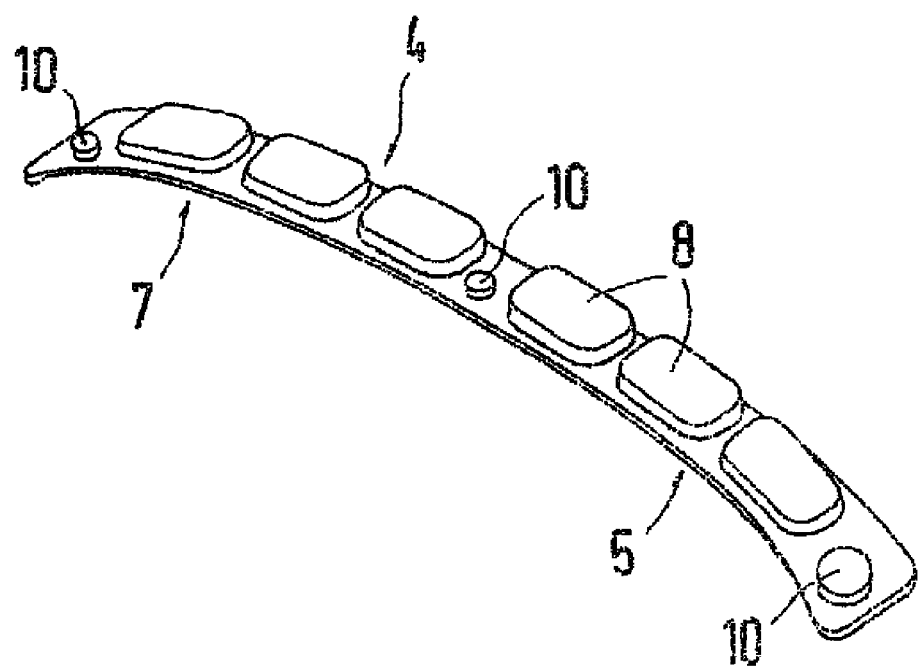
FIG. 4 is a diagrammatic, perspective view of a holding-down device configured as a strip.

In order to be able to avoid impressions of the holding-down device 4 on the convertible top cloth, as seen over the long term, the surface pressure should not exceed a certain value, for example 10 N/mm$^2$. In this respect, it is expedient to configure a supporting surface 7, via which the holding-down device 4 is supported on the convertible top cloth, to be as large as possible. The holding-down device 4 which is configured in the manner of a strip, as shown in FIG. 4, has a large supporting surface 7. According to FIG. 4, the holding-down device 4 extends over at least part of the transverse dimensions of the convertible top compartment cover 1, with, in order to fasten the holding-down device 4 configured as a strip, at least one positioning element 8 being formed, the positioning element 8 facing the convertible top compartment cover 1 and interacting with a positioning opening 9 (cf. FIG. 1) disposed on the convertible top compartment cover 1. In the embodiment of the holding-down device 4 according to FIG. 4, a total of six positioning elements 8 are provided which are disposed generally linearly and are formed in a complementary manner to a total of six positioning openings 9 (cf. FIG. 1) on the convertible top compartment cover 1. In this case, it is conceivable that the at least one positioning element 8 is configured as a plug-in element which can be plugged into a plug-in opening disposed on the convertible top compartment cover 1. The at least one positioning element 8 preferably engages in a form-fitting manner in the associated positioning opening 9 on the convertible top compartment cover 1.

In an advantageous development, it is also conceivable for the positioning element 8 to be configured as a latching element and, when plugged into the positioning opening 9, to latch to an edge of the same. The positioning elements 8 together with the positioning openings 9 on the convertible top compartment cover bring about simple and at the same time exact fitting of the holding-down device 4 on the convertible top compartment cover 1, since the plugging of the positioning elements 8 into the positioning openings 9 enables the holding-down device 4 to already be aligned exactly on the convertible top compartment cover 1. If the at least one positioning element 8 is also configured as a latching element, the holding-down device 4 can be connected reliably and fixedly to the convertible top compartment cover 1 just via the latching connection.

In particular when the at least one positioning element 8 is configured as a plug-in element, a fixed connection between the holding-down device 4 and the convertible top compartment cover 1 can be achieved by an at least punctiform adhesive bond, the punctiform adhesive bond taking place, according to FIG. 4, preferably by way of a plurality of adhesive points 10. However, such an adhesive bond can also be conceived of in the case of positioning elements 8 which are configured as a latching element, and therefore, in this case, in addition to the latching the adhesive bond ensures the reliable bond between holding-down device 4 and convertible top compartment cover 1.

The invention claimed is:

1. A configuration for reducing friction between a convertible top compartment cover and a convertible top, comprising:
    a convertible top compartment cover;
    a convertible top having a top cloth;
    at least one holding-down device disposed on said convertible top compartment cover for assisting in fixing the convertible top, said holding-down device having a friction-reducing coating facing said convertible top and acting to reduce friction between said holding-down device and the top cloth when said holding-down device contacts the top cloth, said friction-reducing coating formed from a foil fastened to said holding-down device, said foil formed from a material selected from the group consisting of polytetrafluoroethylene and a thermoplastic polyurethane; and
    a further friction-reducing coating at least partially surrounding said holding down device and disposed on said convertible top compartment cover.

2. The configuration according to claim 1, wherein said friction-reducing coating is a self-adhesive film.

3. The configuration according to claim 1, further comprising:
    a support layer at least partially surrounding said holding-down device and also extending between said holding-down device and said convertible top compartment cover, as a result of which said holding-down device is fixed on said convertible top compartment cover via said support layer;
    wherein said further friction reducing coating is formed from a material selected from the group consisting of polytetrafluoroethylene and a thermoplastic polyurethane; and
    wherein at least one of said further friction reducing coating and said support layer is formed as an self-adhesive, film.

4. The configuration according to claim 3, wherein said support layer supporting said holding-down device, and said holding-down device itself form a subassembly which can be premanufactured.

5. The configuration according to claim 1, wherein said holding-down device is a strip extending over at least part of transverse dimensions of said convertible top compartment cover.

6. The configuration according to claim 5, wherein:
    said convertible top compartment cover has a positioning opening formed therein; and
    said holding-down device has at least one positioning element for interacting with said positioning opening disposed in said convertible top compartment cover.

7. The configuration according to claim 6, wherein said positioning element is configured to be plugged into said positioning opening disposed in said convertible top compartment cover.

8. The configuration according to claim 5, wherein said holding-down device configured as said strip is adhesively bonded, at least in a punctiform manner, to said convertible top compartment cover.

* * * * *